United States Patent
Barrow et al.

(10) Patent No.: US 8,027,316 B1
(45) Date of Patent: Sep. 27, 2011

(54) EFFICIENT SELECTION OF INTEROPERABILITY GATEWAY FOR CDMA TERMINATED PTT CALLS

(75) Inventors: Steven Barrow, South Riding, VA (US); Safwan Khan, Gainsville, VA (US); Trinh Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1266 days.

(21) Appl. No.: 11/495,860

(22) Filed: Jul. 28, 2006

(51) Int. Cl.
*H04B 7/216* (2006.01)
(52) U.S. Cl. ............ 370/335; 455/436; 455/552.1
(58) Field of Classification Search ........... 455/552.1, 455/552, 436; 370/352
See application file for complete search history.

(56) References Cited

U.S. PATENT DOCUMENTS

| | | | |
|---|---|---|---|
| 6,094,578 A | 7/2000 | Purcell et al. | |
| 6,157,834 A | 12/2000 | Helm et al. | |
| 6,360,093 B1 | 3/2002 | Ross et al. | |
| 6,363,431 B1 | 3/2002 | Hammer et al. | |
| 6,424,638 B1 | 7/2002 | Ray et al. | |
| 6,477,150 B1 | 11/2002 | Maggenti et al. | |
| 6,560,457 B1 | 5/2003 | Silver et al. | |
| 6,725,053 B2 | 4/2004 | Rosen et al. | |
| 6,763,226 B1 | 7/2004 | McZeal, Jr. | |
| 7,359,731 B2* | 4/2008 | Choksi | 455/552.1 |
| 2002/0086701 A1* | 7/2002 | Salmi et al. | 455/552 |
| 2003/0235184 A1* | 12/2003 | Dorenbosch et al. | 370/352 |
| 2004/0048615 A1* | 3/2004 | Kato et al. | 455/435.1 |
| 2006/0052130 A1* | 3/2006 | Choksi | 455/552.1 |
| 2006/0258370 A1* | 11/2006 | Sudit et al. | 455/456.1 |
| 2007/0281699 A1* | 12/2007 | Rasanen | 455/436 |

* cited by examiner

*Primary Examiner* — Rafael Pérez Gutiérrez
*Assistant Examiner* — Marcos Batista

(57) ABSTRACT

A communications system includes a first PTT network, and a second PTT network having a plurality of interoperability gateways. A method for efficiently selecting an interoperability gateway for PTT calls terminated at the second PTT network includes receiving a PTT call request from the first PTT network, the PTT call request identifying a target subscriber unit on the second PTT network and forwarding the PTT call request to a first interoperability gateway. Notification is received if the request has succeeded, and the notification includes an identification of the target and a second interoperability gateway. This information is stored in cache for directing subsequent PTT calls to the same target to the corresponding second interoperability gateway. In one embodiment, the first PTT network is an iDEN network and the second PTT network is a HPPTT network and the PTT call is a HPPTT call.

15 Claims, 4 Drawing Sheets

EFFICIENT SELECTION OF INTEROPERABILITY GATEWAY FOR CDMA TERMINATED PTT CALLS

FIELD OF THE INVENTION

The present invention relates generally to wireless communications systems and more particularly to systems and methods for facilitating Push-to-Talk (PTT) calls between a code division multiple access (CDMA) network and a second PTT network.

BACKGROUND OF THE INVENTION

PTT services, also known as walkie-talkie or dispatch services, provide near-instant, half-duplex communication between a PTT caller and one or more target PTT users. PTT services are typically offered as a subscription service on a wireless communications system, which may also offer interconnect, short message service (SMS), packet data and other communications services to its subscribers. Each wireless communications system facilitates communications using one or more wireless technologies such as CDMA, global system for mobile communication (GSM) or time division multiple access (TDMA). Known PTT technologies include Nextel's Direct Connect®, Qualcomm's QChat and Push-to-Talk over Cellular (PoC).

A PTT call spanning more than one PTT network or technology may be connected through one or more gateways that translate between signaling and media protocols of the networks. For example, a High Performance PTT (HPPTT) CDMA network (e.g., QChat) includes a plurality of interoperability gateways adapted to receive PTT call requests from an external PTT network, such as an Integrated Digital Enhanced Network (iDEN network). A PTT call from a subscriber on an iDEN network to a target subscriber on a conventional HPPTT network may be forwarded to any interoperability gateway on the HPPTT network. The gateway forwards the call to a regional HPPTT Server which manages the PTT call within the HPPTT network.

The target subscriber, however, may be located in a remote region, resulting in inefficient PTT call handling between the HPPTT network and the external PTT network. For example, a PTT call intended for a HPPTT subscriber roaming in New York may be routed to a HPPTT network interoperability gateway in California, and the HPPTT Server in California will be responsible for establishing the PTT call with the HPPTT target roaming in New York, resulting in a cross country PTT call. There is a need for an efficient system and method for handling PTT calls from an external system where the PTT targets are located in a HPPTT network.

SUMMARY OF THE INVENTION

The present invention is a system and method for efficiently selecting an interoperability gateway for HPPTT network terminated PTT calls. In one aspect of the present invention, a communications system includes a first PTT network and a second PTT network having a plurality of interoperability gateways. A method for efficiently selecting an interoperability gateway for PTT calls terminated at the second PTT network includes receiving a PTT call request from the first PTT network, the PTT call request identifying a target subscriber unit on the second PTT network and forwarding the PTT call request to a first interoperability gateway. Notification is received if the request has succeeded, and the notification includes an identification of the target and a second interoperability gateway. This information is stored in cache for directing the PTT calls to the same target to the corresponding second interoperability gateway.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
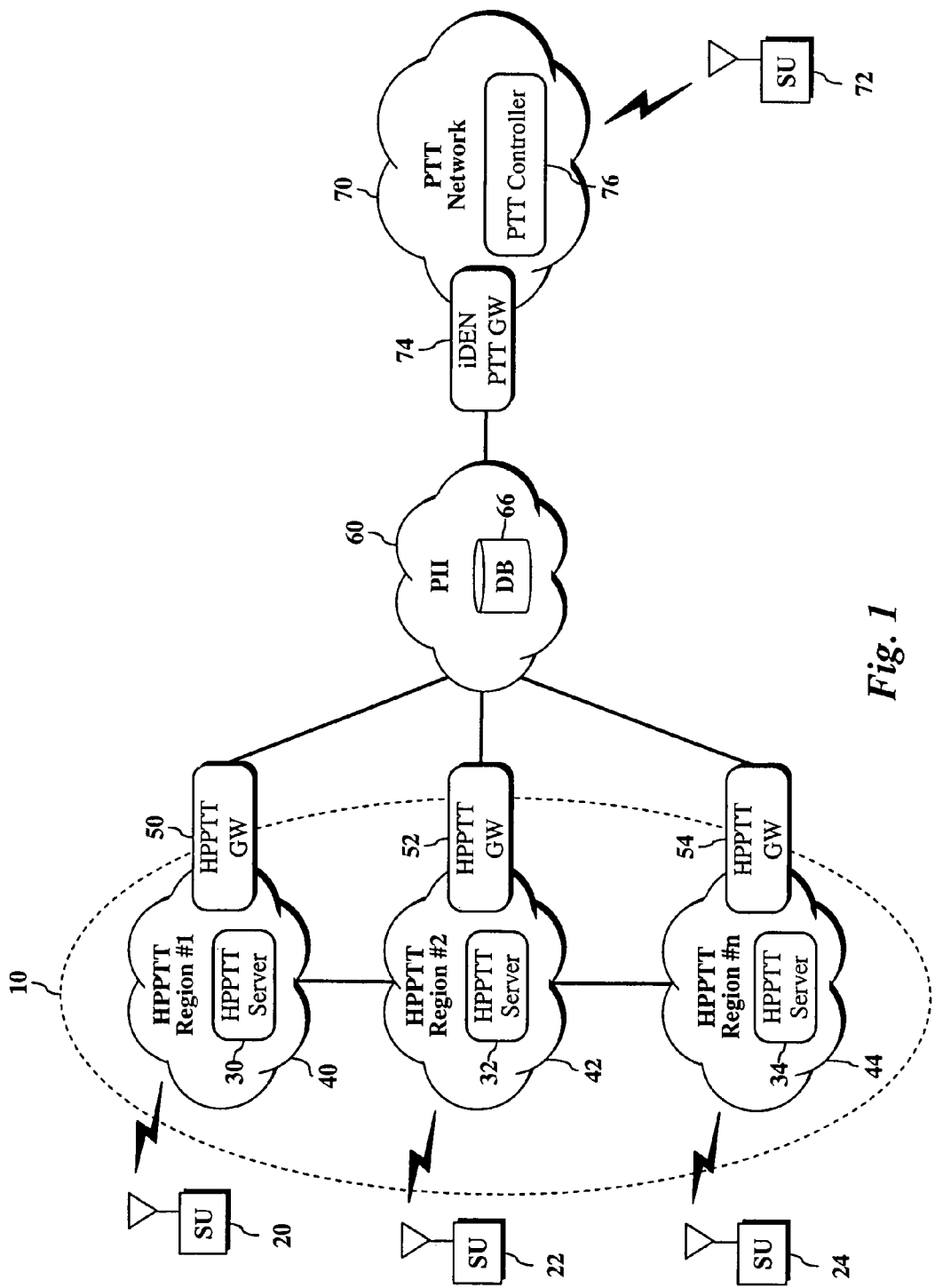
FIG. 1 is an exemplary PTT network architecture in accordance with the present invention.

An embodiment of the present invention will now be described with reference to FIG. 1. A wireless communications system 10 provides communications services such as interconnect, short message service (SMS), packet data and push-to-talk, to a plurality of subscriber units 20, 22 and 24 using one or more wireless technologies such as code division multiple access (CDMA), global system for mobile communication (GSM), time division multiple access (TDMA) or Advanced Mobile Phone Service (AMPS). The subscriber units 20, 22 and 24 are devices adapted to communicate with the wireless communications system 10 such as mobile telephones, personal digital assistants, and portable computers. The subscriber units 20, 22, and 24 may also include wireline devices coupled to the wireless communications network 10 through a physical connection, such as through the Internet.

In the exemplary embodiment, the wireless communications system 10 includes a 3G CDMA2000 1xEV-DO network providing High Performance PTT services, and each subscriber unit 20, 22 and 24 is an HPPTT-enabled device. In one embodiment, the HPPTT services utilize a Voice-over-IP ("VoIP") PTT communications technology for 3G CDMA networks that enables near-instant, one-to-one and one-to-many half-duplex communication. A HPPTT call is formed by combining separate IP connections between each subscriber unit at a HPPTT Server, such as HPPTT servers 30, 32 and 34. Each HPPTT server 30, 32 and 34 manages HPPTT calls originating within its respective regional network 40, 42 and 44, respectively, and provides HPPTT application services to the subscriber units operating therein.

In operation, a HPPTT call may be originated by a subscriber unit 20 with the single press of a PTT button. HPPTT software on the subscriber unit 20 initiates a call request to the regional HPPTT server 30, which establishes IP communications with each target subscriber unit, such as subscriber units 22 and 24, through their respective regional HPPTT servers 32 and 34. The originating HPPTT subscriber unit 20 receives presence information from the HPPTT Server 30 concerning the availability of each target subscriber unit 32 and 34. If a target user is available, the call originator can begin speaking. Communications between participating subscriber units are facilitated using voice-over Internet protocol (VoIP) technologies in which voice information is converted to digital form and transmitted over IP-based data networks in data packets.

PTT calls may also be originated from an external network to a target HPPTT subscriber unit on the HPPTT network 10. In one embodiment, each HPPTT region includes an interoperability gateway, 50, 52 and 54, respectively (referred to herein as HPPTT Gateways), that facilitates communication between the wireless communications system 10 and a PTT interoperability infrastructure (PII) 60. The PII 60 also communicates with at least one other PTT network 70 through an inter-working gateway 74. The PTT network 70 may be any communications system, including wireless and wireline networks, that facilitates push-to-talk communications between at least two devices. In the exemplary embodiment, the PTT network 70 is an Integrated Dispatch Enhanced Network (iDEN) adapted to communicate with the PII 60 through the interoperability gateway 74, which is an iDEN PTT Gateway. In alternate embodiments, other dispatch protocols and/or technologies may be supported including PTT over Cellular network (PoC). A person having ordinary skill in the art will appreciate that the illustrated embodiment is exemplary and that any number of networks and wireless and wireline devices may be inter-worked and other wireless technologies and components may be implemented.

The PII 60 is an inter-working architecture that provides a core infrastructure to which PTT service providers may connect to enable inter-carrier and cross-technology PTT sessions. The PII 60 is adapted to assist in translating and managing PTT sessions between a plurality of PTT networks, such as the iDEN network 70 and the HPPTT network 10. In the exemplary embodiment, signaling messages between the HPPTT network 10 and the iDEN network 70 are based on standard Session Internet Protocol (SIP) signaling and the PII 60, HPPTT Gateways 50, 52 and 54 and iDEN PTT Gateway 74 support UDP and TCP transport protocols. Media messages passing between the HPPTT network 10 and the iDEN network 70 are transported using the RTP standard over UDP. In an alternate embodiment, the PII 60 uses EVRC for media packets on HPPTT-iDEN calls. The PII 60 is adapted to handle media transcoding between networks, though it is contemplated that media transcoding may be performed by the iDEN PTT Gateway 74 or other interoperability gateways.

In operation, a subscriber unit 72 initiates a PTT call on the PTT network 70 to a target subscriber unit 20 on the HPPTT network 10. The PTT network 70 determines that subscriber unit 20 is not a subscriber of the PTT network 70, for example, by checking the domain of the target address. The PTT network 70 next forwards the initial PTT request to the PII 60 through the iDEN PTT Gateway 74. In one embodiment, the iDEN PTT Gateway 74 translates signaling and messaging to a common protocol used by the PII 60, such as SIP. The PII 60 determines the home network associated with target subscriber address and forwards the request to a HPPTT Gateway, such as gateway 54, of the HPPTT network 10. The HPPTT network 10 processes the initial request, attempts to establish PTT communications with the target subscriber unit 20, and responds to the PII 60. The PII 60 manages the PTT session between subscriber units 20 and 72, performing necessary translation between the formats and protocols of the HPPTT network 10 and iDEN network 70.

Figure 2:
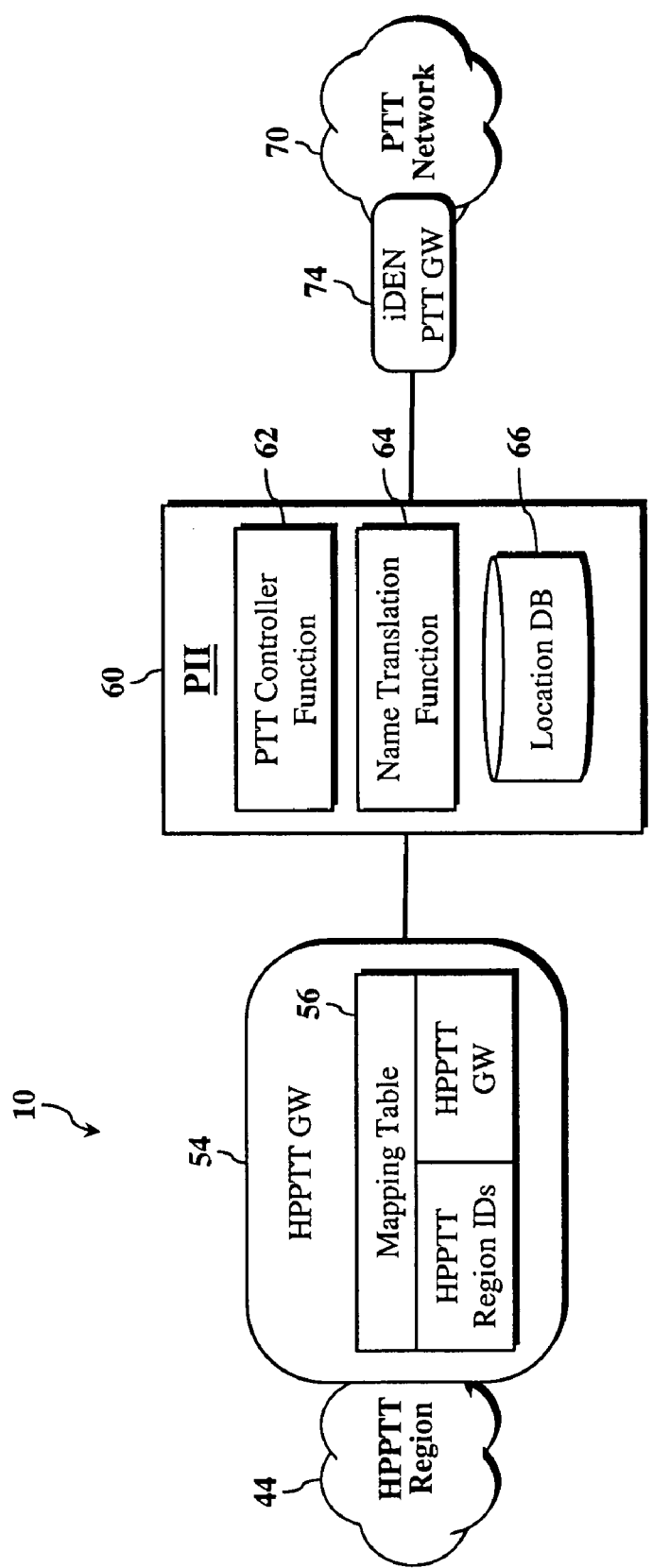
FIG. 2 illustrates an embodiment of a PTT Interoperability Infrastructure and a HPPTT interoperability gateway in accordance with the present invention.

An embodiment of the PII 60 and the HPPTT Gateways will be described in greater detail with reference to FIG. 2. The PII 60 includes a PTT controller function 82 which is adapted to manage PTT sessions between the PTT network 70 and the HPPTT network 10, including the selection of one of the HPPTT Gateways to which to forward incoming PTT calls. A name translation function 84 provides address translation between the iDEN addressing scheme (i.e., UFMIs) and the HPPTT addressing scheme (i.e., SIP URI). In one embodiment, iDEN subscriber units are adapted to initiate PTT calls to a target UFMI. HPPTT subscribers are assigned a UFMI (e.g., the HPPTT target's public telephone number) by the iDEN network for use with the PTT call.

In the exemplary embodiment, the PII 60 communicates with the HPPTT Gateways 50-54 and iDEN PTT Gateway 74 using SIP messaging. During PTT call setup, the PTT controller function 62 queries a location service database 66 which stores the last known location subscriber units who participating in inter-network calls through the PII 60. If the HPPTT target 20 is found in the location service database 66, the PTT controller function 62 forwards the PTT call request to the HPPTT Gateway associated with the HPPTT target 20's last known location. If the HPPTT target 20 is not found, then the PTT controller function 62 selects a HPPTT Gateway, in accordance with stored routing rules, to receive the PTT call request.

Figure 3:
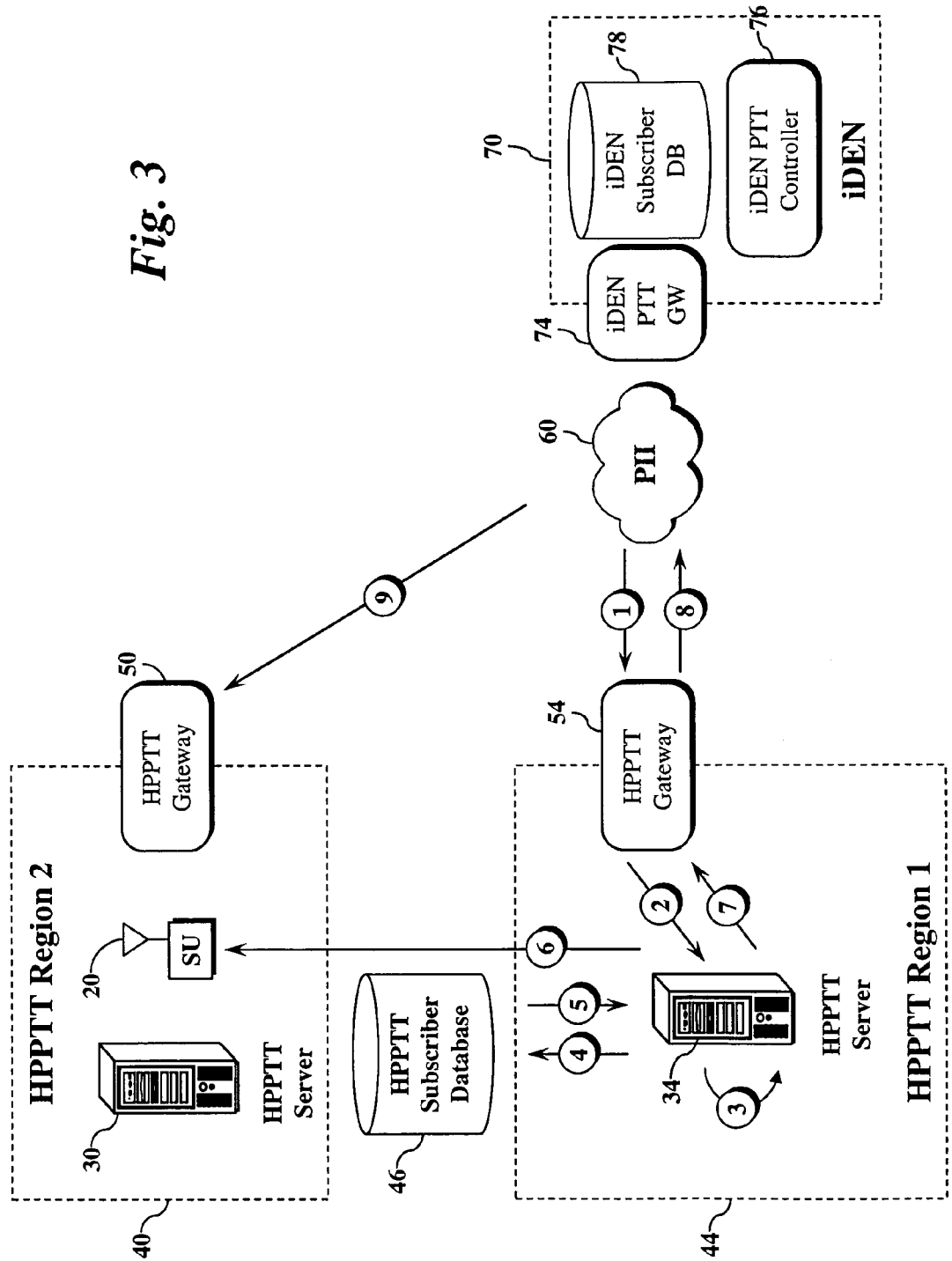
FIG. 3 illustrates an embodiment of an operation of the PTT network architecture of FIG. 1.
Figure 4:
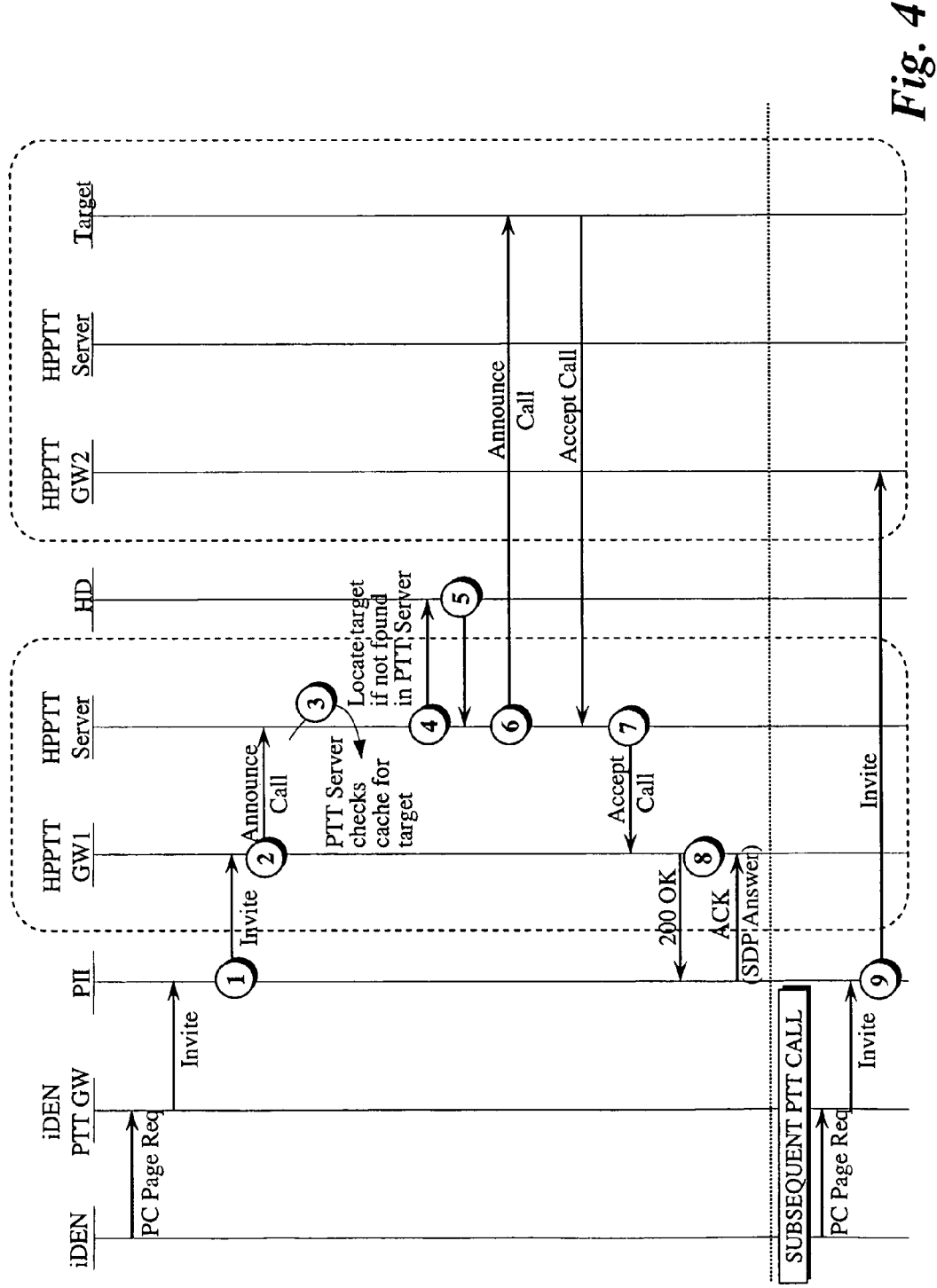
FIG. 4 is a call flow diagram illustrating an embodiment of an operation of the PTT network architecture of FIG. 1.

An embodiment of an operation of the exemplary system will now be described with reference to FIGS. 3 and 4. A PTT call originated on the iDEN network is directed to at least one HPPTT target subscriber unit 20. The iDEN PTT Controller 76 on the iDEN network 70 is the serving PTT processor for the call, and the iDEN Subscriber Database 78 is adapted to direct all HPPTT targeted calls to the iDEN PTT Gateway 74. The iDEN PTT Gateway 74 receives the page request from the iDEN network 70, prepares a corresponding SIP INVITE request and transmits the SIP INVITE request to the PII 60 for forwarding to the HPPTT target subscriber unit 20. In step 1, the PII 60 receives the SIP INVITE request and replies with a provisional response to the iDEN PTT Gateway 74. The PII 60 selects a HPPTT Gateway associated with the target HPPTT network and forwards the request to the selected gateway. In the exemplary embodiment, the PII 60 lacks current information regarding the location of the subscriber unit 20 in the HPPTT network and selects a HPPTT Gateway 54 based on stored routing rules. The SIP INVITE message is routed through the SIP network to the selected HPPTT Gateway 54.

In step 2, the HPPTT Gateway 54 transmits a HPPTT Page Request message to a regional HPPTT Server 34. In step 3, the HPPTT Server 34 queries a local cache for the location of the target subscriber unit 20. If the target subscriber unit 20 is not found in the cache, the HPPTT Server 34 queries the HPPTT Subscriber Database 46 in step 4 for the location of the target subscriber unit 20, and the HPPTT Subscriber Database 46 returns the target subscriber unit's location in step 5. In the exemplary embodiment, the target subscriber unit 20 is located in a second HPPTT Region 40 that includes the regional HPPTT Server 30 and the HPPTT Gateway 50. Upon receiving the location of the target subscriber unit 20, the HPPTT Server 34 then transmits a HPPTT Page Request message to the target subscriber unit 20 through a second regional network in step 6.

In step 7, the target device returns a HPPTT Call Accept message to the HPPTT Server 34, and the HPPTT Server 34 transmits the Call Accept message to the HPPTT Gateway 54 that received the call request. In one embodiment, the HPPTT Call Accept message is a SIP response message (e.g., 2000K)

that is sent from the HPPTT Server to the HPPTT Gateway 54, which includes a regional ID of the HPPTT Server 30 serving the target subscriber unit 20. In step 8, upon receipt of the Call Accept message, the HPPTT Gateway 54 queries the HPPTT Gateway-to-HPPTT Regional ID mapping table (see mapping table 56 in FIG. 2) for the regional ID received in the message. The HPPTT Gateway 54 forwards the SIP 200 OK response message to the PII 60, including the ID of the serving HPPTT Gateway 50. The PII 60 returns an SDP answer (acknowledgement message) to the HPPTT Gateway 54, and stores the regional ID of the target subscriber unit 20 in the location database 66 (see FIGS. 1 & 2). The PII 60 then facilitates the PTT call through the HPPTT Gateway 54.

In step 9, when the PII 60 receives a subsequent call request directed to the target subscriber unit 20, the PII 60 queries the location database 66 for the target subscriber unit 20 and selects the HPPTT Gateway corresponding to the database entry—in this case HPPTT Gateway 50. The PII 60 transmits a SIP INVITE message to the HPPTT Gateway 50 which is local to the target subscriber unit 20.

With the introduction of efficient HPPTT Gateway selection, the initial PTT call to the roamed HPPTT target will be routed internally within the HPPTT network. Subsequent PTT calls to the roamed HPPTT target will be routed to the HPPTT Gateway where the HPPTT target was last located. In other words, subsequent calls are routed automatically to the appropriate HPPTT region. In one embodiment, if the target subscriber unit 20 is no longer located in the HPPTT Region 40, then steps 2 through 8 are repeated and the target subscriber unit's current location, if known, is stored in location database 66 for use in subsequent calls.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a communications system including a first Push-to-Talk (PTT) network, and a second PTT network having a plurality of interoperability gateways, a method for efficiently selecting an interoperability gateway for PTT calls terminated at the second PTT network comprising:
   receiving, by a PTT interoperability infrastructure, a PTT call request from the first PTT network, the PTT call request identifying a target subscriber unit on the second PTT network;
   forwarding, by the PTT interoperability infrastructure, the PTT call request to a first interoperability gateway of the second PTT network;
   receiving, by the PTT interoperability infrastructure, a notification that the PTT call request has succeeded, the notification including an identification of the target subscriber unit and an identification of a second interoperability gateway of the second PTT network, wherein the second interoperability gateway corresponds to a current location of the target subscriber unit;
   storing, by the PTT interoperability infrastructure, an identifier of the target subscriber and an identifier of the second interoperability gateway in a cache for subsequent use in routing calls to the target subscriber unit; and
   routing a subsequent PTT call request from the first PTT network identifying the target subscriber unit to the second interoperability gateway of the second PTT network.

2. The method of claim 1 wherein the first PTT network is an Integrated Digital Enhanced Network iDEN network and wherein the method further comprises the steps of:
   generating, at the Integrated Digital Enhanced Network iDEN network, the PTT call request;
   transmitting the request to an Integrated Digital Enhanced Network iDEN PTT Gateway; and
   translating the Integrated Digital Enhanced Network iDEN PTT call request into a standard protocol.

3. The method of claim 2 wherein the second PTT network is a High Performance Push-to-Talk (HPPTT) network, and wherein the step of forwarding comprises:
   selecting the first interoperability gateway; and
   transmitting the PTT call request to the first interoperability gateway using the standard protocol.

4. The method of claim 3 wherein the second PTT network is a HPPTT network, and wherein the step of forwarding further comprises:
   translating, by the second interoperability gateway, the PTT call request to a HPPTT protocol.

5. The method of claim 4 wherein the standard protocol is a session initiation protocol.

6. The method of claim 1 wherein the step of forwarding further comprises:
   searching a cache of interoperability gateway mappings for the target subscriber; and
   if the target subscriber is found, forwarding the PTT call to a corresponding interoperability gateway.

7. The method of claim 1 further comprising the steps of:
   receiving, by the PTT interoperability infrastructure, a second PTT call request, the PTT call request identifying the target subscriber unit on the second PTT network;
   searching, by the PTT interoperability infrastructure, the cache for the target subscriber unit; and
   forwarding, by the PTT interoperability infrastructure, the PTT call request to a corresponding interoperability gateway.

8. The method of claim 1 wherein the first PTT network is a Push-to-Talk over Cellular (PoC) network and wherein the method further comprises the step of generating, at the PoC network, the PTT call request, transmitting the PoC PTT call request to a gateway, and translating the PoC PTT call request into a standard protocol.

9. The method of claim 1, wherein the second interoperability gateway is associated with a PTT server on the second PTT network that services the current location of the target subscriber unit.

10. In a Push-to-Talk (PTT) communications system including a first PTT network and a second PTT network having a plurality of interoperability gateways, a system comprising:
    an interface to the first PTT network;
    an interface to the second PTT network;
    a controller adapted to:
        receive a PTT call request from the first PTT network, the PTT call request identifying a target subscriber unit on the second PTT network;
        forward the PTT call request to a first PTT interoperability gateway of the second PTT network;
        receive notification that the request has succeeded, the notification including an identification of a second PTT interoperability gateway of the second PTT network, wherein the second PTT interoperability gateway corresponds to a current location of the target subscriber unit;
        store an identifier of the target subscriber and an identifier of the interoperability gateway; and route a subsequent PTT call request from the first PTT network identifying the target subscriber unit to the second interoperability gateway of the second PTT network.

11. The system of claim 10 wherein the controller is further adapted to:
   select the first interoperability gateway; and
   transmit the PTT call request to the first interoperability gateway, using the standard protocol.

12. The system of claim 10 wherein the controller is further adapted to:
   translate, by the second interoperability gateway, the PTT call request to a HPPTT protocol.

13. The system of claim 10 wherein the controller is further adapted to:
   search a cache of target subscriber to interoperability gateway mappings for the target subscriber; and
   if the target subscriber is found, forwarding the target subscriber to the corresponding interoperability gateway.

14. The system of claim 10 wherein the controller is further adapted to:
   receive a second PTT call request, the PTT call request identifying the target subscriber unit on the second PTT network;
   search the cache for the target subscriber unit; and
   forward the PTT call request to the corresponding interoperability gateway.

15. The system of claim 10, wherein the second interoperability gateway is associated with a PTT server on the second PTT network that services the current location of the target subscriber unit.

* * * * *